(12) United States Patent
Cooper et al.

(10) Patent No.: US 10,805,035 B2
(45) Date of Patent: Oct. 13, 2020

(54) LINK 16 TRANSCEIVER WITH INTEGRAL SIGNAL NULLING SYSTEM

(71) Applicant: BAE Systems Information and Electronic Systems Integration Inc., Nashua, NH (US)

(72) Inventors: David M Cooper, New York, NY (US); John H Chongoushian, Emerson, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 387 days.

(21) Appl. No.: 15/986,027

(22) Filed: May 22, 2018

(65) Prior Publication Data

US 2019/0363819 A1 Nov. 28, 2019

(51) Int. Cl.
  *H04K 3/00* (2006.01)
  *H04B 1/717* (2011.01)
  *G01S 7/36* (2006.01)

(52) U.S. Cl.
  CPC .......... *H04K 3/228* (2013.01); *H04B 1/7174* (2013.01); *H04K 3/226* (2013.01); *H04K 3/25* (2013.01); *H04K 3/28* (2013.01); *G01S 7/36* (2013.01)

(58) Field of Classification Search
  None
  See application file for complete search history.

(56) References Cited

U.S. PATENT DOCUMENTS

| | | | |
|---|---|---|---|
| 8,902,114 B1 * | 12/2014 | West | H01Q 13/085 343/767 |
| 8,976,837 B1 | 3/2015 | Lomp et al. | |
| 9,118,438 B2 | 8/2015 | Snodgrass et al. | |
| 9,250,312 B1 * | 2/2016 | Knibbe | G01S 5/16 |
| 10,158,416 B1 | 12/2018 | Cooper et al. | |
| 2008/0025446 A1 | 1/2008 | Van Wechel et al. | |
| 2009/0144324 A1 | 6/2009 | Sturdy | |

(Continued)

OTHER PUBLICATIONS

International Search Report, PCT/US19/28711, 9 pages, dated Jul. 30, 2019.

(Continued)

*Primary Examiner* — Whitney Moore
(74) *Attorney, Agent, or Firm* — Maine Cernota & Rardin

(57) ABSTRACT

A secure wireless transceiver, such as a link 16 transceiver, receives signals using an antenna array having an SOC associated with each antenna element in the array. The SOC's digitize and channelize received data for transmission to a message nulling system that mitigates jamming. The antenna array can be conformal, and can replace an existing Link 16 blade. The disclosed transceiver can be a modified CMN-4 transceiver with digitizing and channelizing moved to the SoC's, and replaced by the nulling system. The transceiver uses applicable TRANSEC information to assign received data to the logical Link 16 channels before nulling, and embodiments apply nulling only to channels of interest, thereby improving the nulling and reducing side lobes. Embodiments distinguish between desired and unwanted signals based on known Link 16 signal features and/or situational awareness, rather than signal amplitudes, thereby enabling nulling of even weak jamming signals.

28 Claims, 9 Drawing Sheets

(56) References Cited

U.S. PATENT DOCUMENTS

2014/0038541 A1  2/2014  Reiss
2015/0226856 A1  8/2015  Zarowski et al.

OTHER PUBLICATIONS

Gupta et al, Effects of Antenna Element Bandwidth on Adaptive Array Performance, IEEE Transactions on Antennas and Propagation, vol. 53, No. 7, Jul. 2005, 5 pages.
Thomas Dean Moore; Analytic Study of Space-Time and Space-Frequency Adaptive Processing for Radio Frequency Interference Suppression; Ohio State University, 2002, 226 pages.
R.T. Compton, Jr.; The Bandwidth Performance of a Two-Element Adaptive Array with Tapped Delay-Line Processing; IEEE Transactions on Antennas and Propagation, vol. 36, No. 1, Jan. 1988, 10 pages.

* cited by examiner

LINK 16 TRANSCEIVER WITH INTEGRAL SIGNAL NULLING SYSTEM

FIELD

The following disclosure relates generally to secure wireless network communications, and more particularly to methods for mitigating jamming attacks in tactical wireless communication networks.

BACKGROUND

One of the requirements for virtually any communication system is the ability to operate reliably over an entire geographical region of interest, despite the presence of various sources of noise, naturally occurring interference, and signal obstructions. In the case of military communication systems, and also for some civilian communication systems, the challenge of providing reliable communications can be greatly increased due to adverse circumstances, such as when operating in Anti-Access Area Denial (A2AD) regions where communications are contested due to the presence of adversarial signals such as adversarial communications, navigation, and jamming signals. In particular, because wireless communication networks are critically important for maintaining coordination and intercommunication between elements of mobile combat assets, it is vital that secure, tactical networks remain resilient in the presence of jamming threats.

When operating in A2AD regions, it is also typically necessary that at least some communications be rendered difficult or impossible for adversaries to intercept and/or interpret. Current approaches that are used to meet these COMSEC (communications security) requirements include various forms of cryptography, referred to as message security or MSEC, as well as transmission security, referred to as TSEC or TRANSEC. TRANSEC typically includes pseudorandom frequency hopping and/or signal covers, wherein a required pseudorandom sequence generation is controlled by a cryptographic algorithm and key. Examples of these approaches include Link 16, Tactical Targeting Networking Technology (TTNT) and Common Data Link (CDL). In particular, Link 16 is a widespread tactical wireless networking system that is used by frontline land, air, and naval systems in the United States, NATO, and allied nations to allow multiple users to share situational awareness data.

In a Link 16 network, information can be transmitted simultaneously on any or all of 51 frequencies that span a designated Link 16 bandwidth (typically 960 MHz to 1,215 MHz) during each of a plurality of timeslots that repeat every time frame, or "epoch." Messages in a Link 16 network are typically transmitted over logical "channels," where each channel is defined and characterized by a unique assignment of timeslots and frequency hopping patterns. Often, a Link 16 transceiver is able to simultaneously monitor more than one of these logical channels. For example, a "CMN-4" transceiver is able to perform "concurrent multi-netting" communication on four channels.

A typical link 16 network is illustrated in FIG. 1. The blocks 10 in the epoch ring 12 represent timeslots, and the stacked rings in the column 16 represent the logical "channels" of the Link 16 network. Accordingly, a plurality of participants 14 are able to communicate simultaneously over the link 16 network because they are assigned to different channels 16 during each timeslot 10 and/or to different timeslots 10 during each epoch 12. The Link 16 messages transmitted within the network include Precise Participant Location and Identification (PPLI) messages that are exchanged between the nodes. Details of the construction of the PPLI messages can be found in MIL-STD-6016.

Despite its inherent anti-jamming features, the effective communication range of a Link-16 network can nevertheless be significantly reduced by an interfering adversary transmitting a focused, localized, high power jamming signal toward the Link-16 nodes. Sometimes, the effects of jamming in a Link 16 network can be mitigated to some extent by increasing transmission powers of the Link 16 nodes and/or by relaying signals through intermediate nodes so as to reduce transmission distances. However, this approach can be expensive, and can suffer from terrain obstructions and shadowing, and from radio horizon limitations. Furthermore, appropriate relay nodes may not be available, or it may not be desirable to burden nodes with the overhead of relaying messages. As a result, unwanted or "enemy" transmissions that are detected by a Link 16 receiver, especially hostile jamming signals, are often much stronger than the signals that are received from desired or "friendly" sources.

Other than increasing power and/or relaying messages, an additional approach that can be used to mitigate jamming attacks is to apply signal nulling to the received signals. According to this approach, and with reference to FIG. 2A, a separate nulling apparatus 200 samples the entire Link 16 bandwidth using an array antenna 202, applies signal nulling to the received signals, and then transmits the nulled signal data to the Link 16 transceiver, where the applicable TRANSEC and COMSEC keys are used to channelize, extract, and decode the link 16 messages included in the received signals.

With reference to FIG. 2B, according to this approach the nulling apparatus 200 converts all of the energy received within the Link 16 bandwidth by each of the array antennae 202 into digital data 206, after which an internal processor 208 uses a nulling algorithm to calculate 208 and apply separate weighting factors 210 to the signals from each of the antennae 202 in the array. In various embodiments, the nulling algorithm can be similar to nulling algorithms known in the art that are implemented as filters used for removing interferences from received GPS signals, such as the "Space Time Adaptive Processing" (STAP) algorithm, as taught for example in US patent application 2008/0025446, in A. J. O'Brien, I. J. Gupta, "An Optimal Adaptive Filtering Algorithm with Zero Antenna-Induced Bias for GNSS Antenna Arrays," Navigation, 57(2), Summer 2010, pp. 87-100, or as taught in US patent application 2015/022685.

The weighted signals are then combined 212, after which the weighting factors are adjusted and re-applied iteratively according to the nulling algorithm so as to minimize the combined result.

The weighting factors as calculated in accord with the nulling algorithm have the effect of nullifying signals received from specific geographical directions or regions. However, the nulling process is typically applied "blindly," i.e. on a purely mathematical, heuristic basis and without any knowledge of the location and/or orientation of the receiving antenna array, and without any knowledge as to the actual locations of friendly and/or hostile transmitters.

The success of this approach depends on a fundamental assumption that the hostile enemy (jamming) signals will always be stronger than the friendly signals. As a result, this approach can result in the inadvertent suppression of friendly signals if the friendly signals are strong. For example, if friendly nodes are approaching a hostile location in close formation, Link 16 messages transmitted between the nodes may initially be stronger than a hostile jamming signal, until the enemy location is reached and the friendly forces spread apart.

Furthermore, nulling algorithms can suppress signals that originate in geographic "side lobes" in addition to signals originating from the primary nulling lobe. These side lobe effects can interfere with transmission from friendly forces even when no enemy lies in that direction. The problem of side lobes is exacerbated by the complexity of the nulling solution that is required so as to simultaneously null the signals received in all 51 channels within the Link 16 bandwidth.

With reference again to FIG. 2B, an additional drawback that is associated with this nulling approach is that after the nulling has been performed, it is often necessary for the nulling apparatus to re-convert the nulled data back into an analog signal 214 and then re-transmit 216 the analog signal to a CMN-4 or other Link 16 transceiver 204, so that it can be received, re-digitized, and interpreted by the COMSEC aware transceiver 204. This additional conversion from digital format back into analog format, and then back into digital format by the transceiver 204 can degrade the quality of the data that is interpreted by the Link 16 transceiver 204.

Yet another disadvantage of existing approaches to Link 16 signal nulling are the cost, space, and weight requirements of providing an additional, large, expensive apparatus in addition to the Link 16 transceiver. In particular, the required space and weight may be a significant barrier to upgrading existing Link 16 installations to include signal nulling.

What is needed, therefore, is an apparatus and method for mitigating the effects of jamming on a TRANSEC-aware wireless communication transceiver such as a Link 16 transceiver, while improving signal quality and minimizing the risk of inadvertent nulling of friendly signals.

SUMMARY

A TRANSEC-aware wireless communication transceiver such as a link 16 transceiver with integral nulling antenna system is disclosed that is able to mitigate the effects of jamming while improving signal quality and minimizing the risk of inadvertent nulling of friendly signals. The disclosed transceiver system detects signals received within the active communication bandwidth using an antenna array. A "System on a Chip" ("SoC") is associated with each antenna in the array, and is used to digitize the received data, and then to transmit the data to a channelizer that channelizes the data and transfers the channelized data to a nulling system. The nulling system applies signal nulling to the channelized data, in embodiments only to selected channels thereof, after which the nulled data is passed to a message controller for further analysis and interpretation. In embodiments, each of the SoC's is TRANSEC-aware, and is able to channelize the data received by its associated antenna element, so that the SoC's in aggregate function as the channelizer.

It should be noted that much of the present disclosure is presented with reference to Link 16 communication and Link 16 transceivers. However, it will be clear to one of skill in the art that the present disclosure is applicable to any secure communication system that is protected by a TRANSEC protocol, and that requires channelizing of received data before it can be analyzed and interpreted. Accordingly, except where the context requires otherwise, references herein to Link 16 should be interpreted to refer generically to all such TRANSEC-protected communication protocols and transceivers.

In embodiments, the disclosed antenna array with SoC's is conformal, and/or configured to be compatible as a direct replacement for an existing Link 16 blade antenna. In some embodiments, the Link 16 transceiver is a conventional Link 16 transceiver, such as a CMN-4 transceiver that has been modified so that the digitizing and channelizing functions have been moved to the SoC's in the antenna array, and the conventional digitizing and channelizing hardware within the transceiver has been replaced by a nulling system that is configured to apply a nulling algorithm to the channelized data. In some of these embodiments, the channelized data is transferred by the SoC's to the transceiver over a conventional Link 16 serial data link that is overclocked so as to accommodate the additional data load. Accordingly, in embodiments of the present disclosure, signal nulling capability can be added to a conventional Link 16 transceiver system simply by replacing the blade antenna with the disclosed antenna array with SoC's, and exchanging appropriate hardware in the transceiver.

Unlike previous approaches, the present nulling apparatus and method are "TRANSEC-aware," i.e. have access to the applicable algorithms and keys that determine frequency hopping and timeslot assignments, and thereby define the logical channels of the Link 16 network. Accordingly, the present nulling apparatus is able to apply nulling algorithms to the received data after it has been channelized, and embodiments are able to apply nulling selectively to only the energy received within the channels that are of interest, rather than to all of the energy received within the entire Link 16 bandwidth.

For example, a modified CMN-4 transceiver may only be able to monitor four channels at any given time. Accordingly, in embodiments, the modified CMN-4 system is able to apply nulling selectively to only the energy that is received in the signal channels that are being monitored. This approach significantly reduces the constraints that are placed on the nulling algorithm, effectively focusing the nulling process onto only the channel(s) that carry the signal of interest, and thereby reducing the complexity of the nulling solution, improving the nulling result, and reducing the occurrence of nulling "side lobes" and of unintended nulling of friendly signals.

Furthermore, embodiments of the present disclosure are able to apply a Link-16 "detector" to the received data, so as to distinguish desired signals from jamming and other undesirable signals on the basis of signal characteristics, rather than signal amplitude. This approach allows embodiments of the present disclosure to null undesired signals and to retain desired signals, even in cases where the desired, friendly signals are stronger than the hostile, undesired signals. In various embodiments, the Link-16 signal detector discriminates on the basis of signal features such as modulation type, pulse rise and/or fall times, pulse widths, and/or other characteristics of Link 16 signals that are very different from typical jamming signals.

Furthermore, embodiments use PPLI and other situational awareness information provided by received Link 16 messages, in combination with instantaneous awareness of the location and orientation of the Link 16 antenna array, to determine geographical directions from which friendly signals can be expected and/or directions from which only enemy signals can be expected, and use this information as a basis from which to calculate initial sets of weighting factors for signal nulling.

And because the received data is channelized by the transceiver system of the present disclosure before the nulling is applied, there is no need to reconvert the nulled data back into analog format and then reconvert to digital format, as is the case with existing approaches to Link 16 nulling.

A first general aspect of the present disclosure is a Link 16 transceiver with integral signal nulling system. The transceiver includes an antenna array comprising a plurality of receiving antenna elements configured to receive wireless signals within a Link 16 bandwidth, for each of the receiving antenna elements, a system-on-a chip (SoC) associated with the receiving antenna element and configured to digitize the wireless signals received by the receiving antenna, a TRANSEC-aware channelizer configured to channelize the digitized wireless signals, a nulling system in data communication with the channelizer, and configured to receive the channelized data and apply weighting factors thereto according to a nulling algorithm so as to convert the channelized data into nulled data in which hostile signals included in the channelized data are suppressed while Link 16 messages included in the channelized data are maintained, and an MSEC-aware Link 16 message controller in data communication with the nulling system, the message controller being configured to receive the nulled data and interpret the Link 16 messages included in the nulled data.

In embodiments, the TRANSEC-aware channelizer is included in the SoC's, in that each SoC is TRANSEC-aware, and each SoC converts the wireless signals received by its associated antenna element into channelized data.

In any of the preceding embodiments, the SoC's cam be configured to channelize and transmit to the nulling system only energy received in Link 16 channels that are designated by the message controller to be channels of interest.

Any of the preceding embodiments can further comprise a serial data link configured for transmission thereby of the channelized data from the SoC's to the nulling system. In some of these embodiments the serial data link is configured for overclocked communication of the channelized data. And in any of these embodiments, the serial data link can be overclocked by a factor of between 200% and 300%.

Any of the preceding embodiments can further comprising a Link 16 detector included in the nulling system and configured to discriminate between Link 16 signals included in the channelized data and signals included in the channelized data that are not Link 16 signals, the nulling system being configured to suppress the data that are not Link 16 data and to maintain the Link 16 signals. In some of these embodiments, the Link 16 detector discriminates between link 16 signals and data that are not Link 16 signals on the basis of at least one of modulation type, pulse rise times, pulse fall times, and pulse widths.

In any of the preceding embodiments, the antenna array can be a conformal antenna array.

In any of the preceding embodiments, the antenna array can further comprise a transmission blade configured for transmitting wireless signals within the Link 16 bandwidth.

In any of the preceding embodiments, the antenna array can be compatible as a direct replacement for a non-arrayed Link 16 blade antenna.

In any of the preceding embodiments, the nulling system can be able to use position and orientation information regarding the antenna array in combination with situational information that includes estimated locations of friendly transmitters to predict and optimize the weighting factors that are applied to the channelized data.

In any of the preceding embodiments, the nulling system can apply a space time adaptive processing algorithm when calculating the weighting factors.

A second general aspect of the present disclosure is a method of suppressing hostile wireless signals while retaining Link 16 messages. The method includes
 a. receiving of wireless signals within a Link 16 bandwidth by a plurality of receiving antenna elements included in an antenna array;
 b. for each of the receiving antenna elements, converting of the received wireless signals into channelized data;
 c. transferring of the channelized data to a nulling system; and
 d. determining a set of weighting factors according to a nulling algorithm and applying the weighting factors to the channelized signals, thereby converting the channelized data into nulled data in which hostile signals included in the channelized data are suppressed while Link 16 messages included in the channelized data are maintained.

In embodiments, for each of the receiving antenna elements, the wireless signals received by the receiving antenna element are converted into channelized data by a TRANSEC-aware SoC that is associated with the receiving antenna element.16. The method of claim 14, further comprising interpreting by an MSEC-aware Link 16 message controller of a Link 16 message included in the nulled data.

Any of the preceding embodiments can include only channelized data in channels that are designated to be channels of interest are transferred by the SoC's to the nulling system.

In any of the preceding embodiments, the channelized data can be transferred to the nulling system via a serial data link.

In any of the preceding embodiments, transferring the channelized data via the serial data link can include overclocking the serial data link. In some of these embodiment, overclocking the serial data link includes overclocking the serial data link by a factor of between 200% and 300%.

In any of the preceding embodiments, determining the weighting factors can include using a Link 16 detector to discriminate between Link 16 signals included in the channelized data and signals included in the channelized data that are not Link 16 signals. In some of these embodiments, the Link 16 detector can discriminate between link 16 signals and data that are not Link 16 signals on the basis of at least one of modulation type, pulse rise times, pulse fall times, and pulse widths.

In any of the preceding embodiments, determining a set of weighting factors according to a nulling algorithm can includes applying a space time adaptive processing algorithm.

In any of the preceding embodiments, determining the weighting factors can include using position and orientation information regarding the antenna array in combination with situational information that includes estimated locations of friendly transmitters to predict and optimize the weighting factors.

A third general aspect of the present disclosure is a method of adding signal nulling capability to a Link 16 transceiver. The method includes replacing an antenna of the Link 16 transceiver with an antenna array comprising a plurality of receiving antenna elements configured to receive wireless signals within a Link 16 bandwidth where, for each of the receiving antenna elements, a TRANSEC-aware system-on-a chip (SoC) is associated with the receiving antenna element and configured to convert the wireless signals received by the receiving antenna element into channelized data, removing from the Link 16 transceiver a subsystem configured for channelizing received data, and installing within the Link 16 transceiver a nulling system in data communication with the SoC's and configured to receive the channelized data therefrom and apply weighting factors thereto according to a nulling algorithm so as to convert the channelized data into nulled data in which hostile signals included in the channelized data are suppressed while Link 16 messages included in the channelized data are maintained, the nulling system being further configured to transfer the nulled data to the Link 16 transceiver.

In embodiments, the antenna array is a conformal antenna array.

Any of these embodiments can further comprise reconfiguring a serial data link of the Link 16 transceiver so as to transfer the channelized data from the SoC's to the nulling system in an overclocked transfer mode. In some of these embodiments, the overclocked transfer mode is overclocked by a factor of between 200% and 300%.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
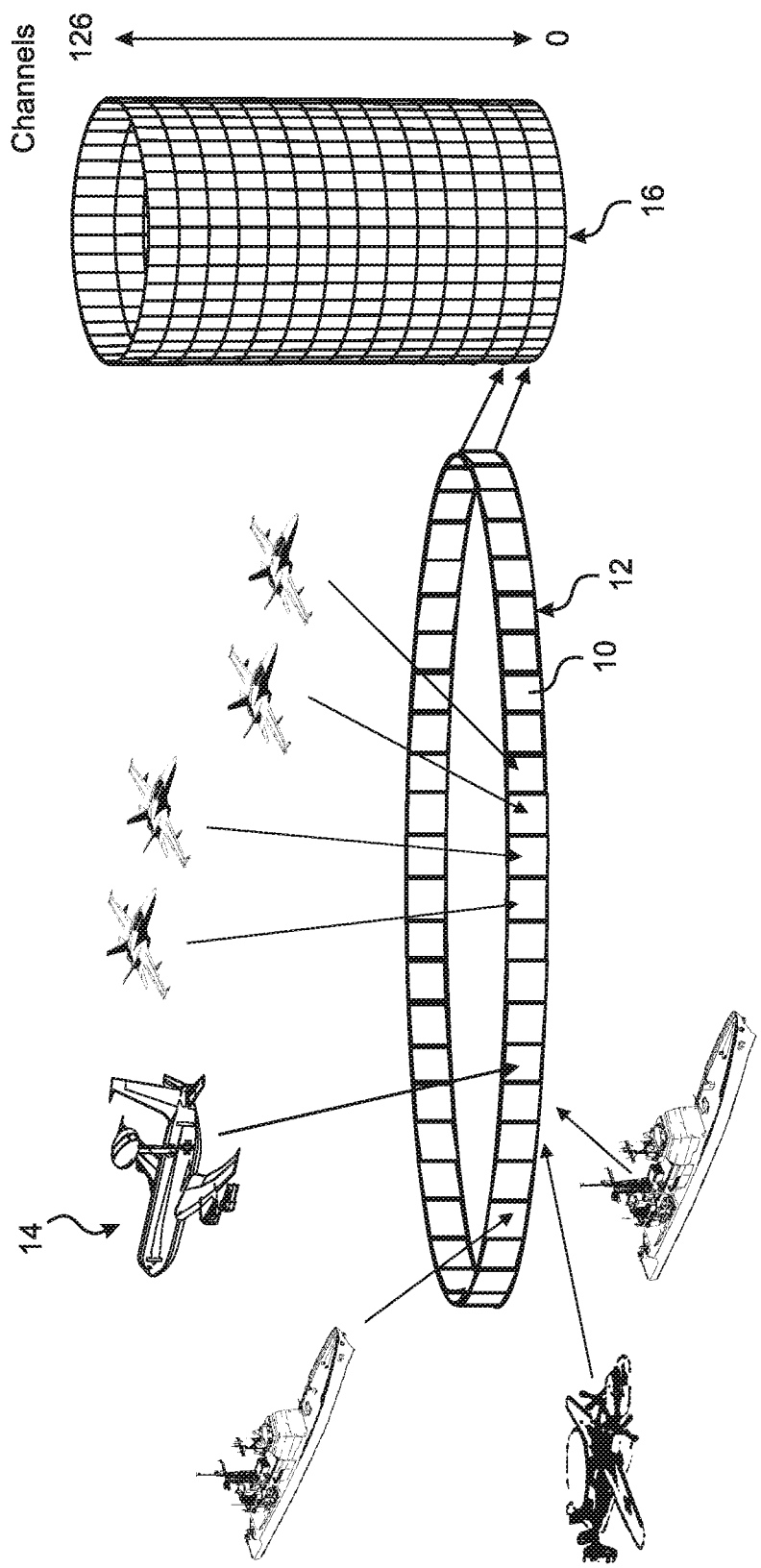
FIG. 1 is a graphical illustration of a typical Link 16 channel architecture of the prior art.
Figure 2A:
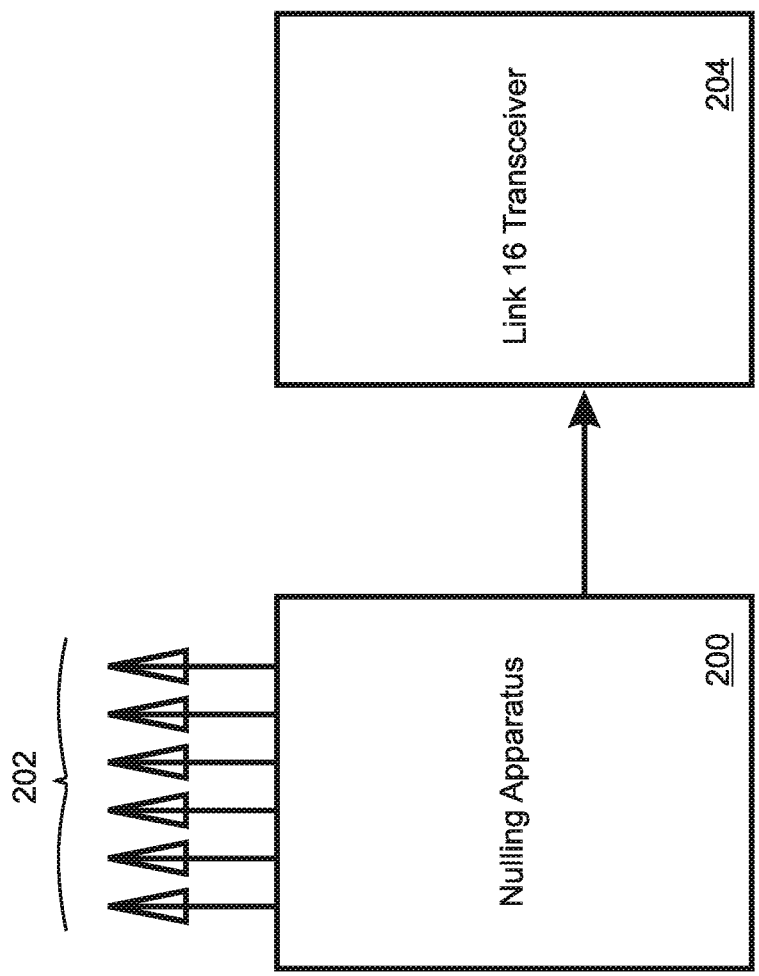
FIG. 2A is a simplified, block diagram illustrating the relationship between an external nulling apparatus and a Link 16 transceiver according to the prior art.
Figure 2B:
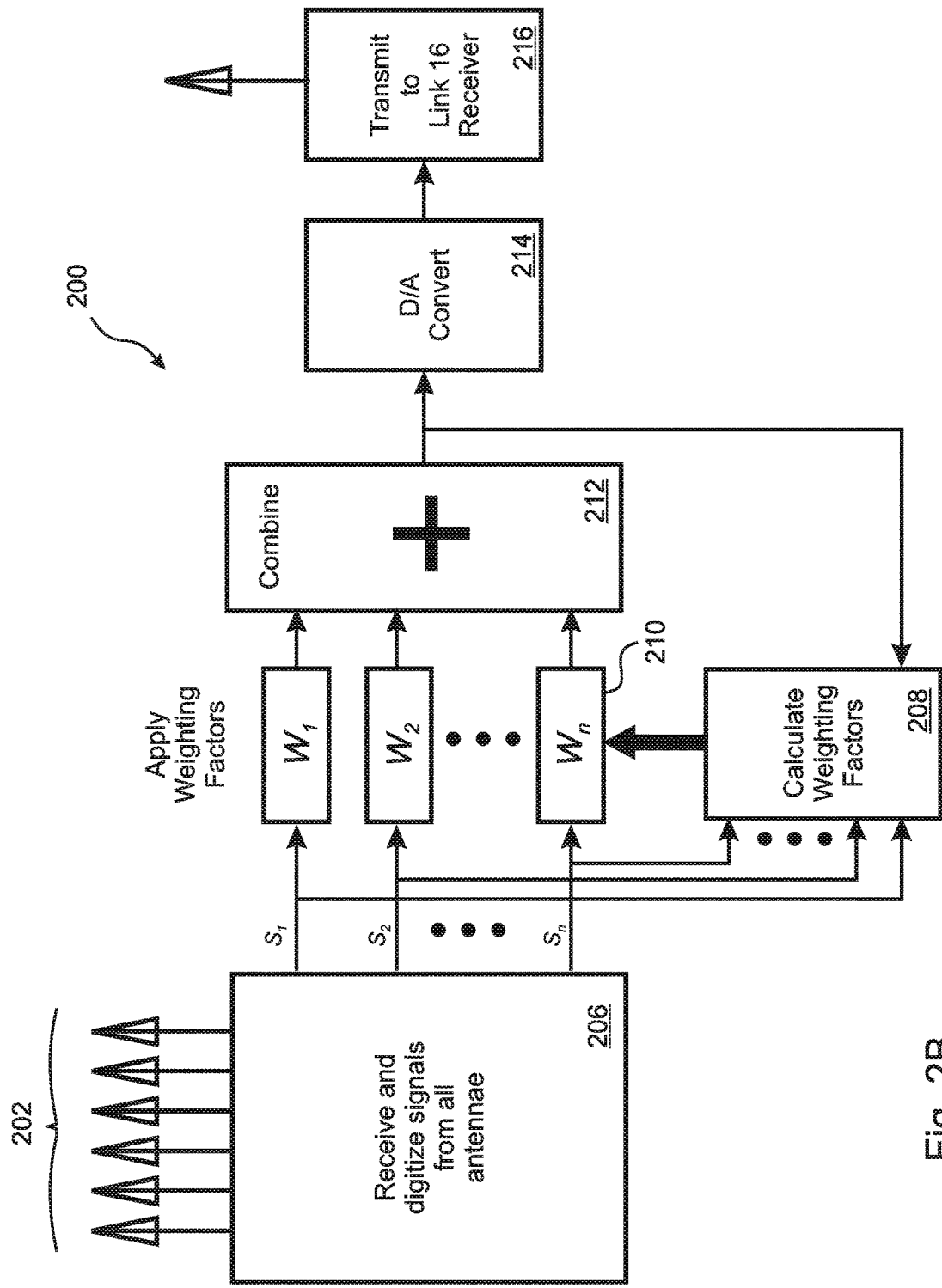
FIG. 2B is a detailed block diagram illustrating components of the external nulling apparatus of FIG. 2A.
Figure 3A:
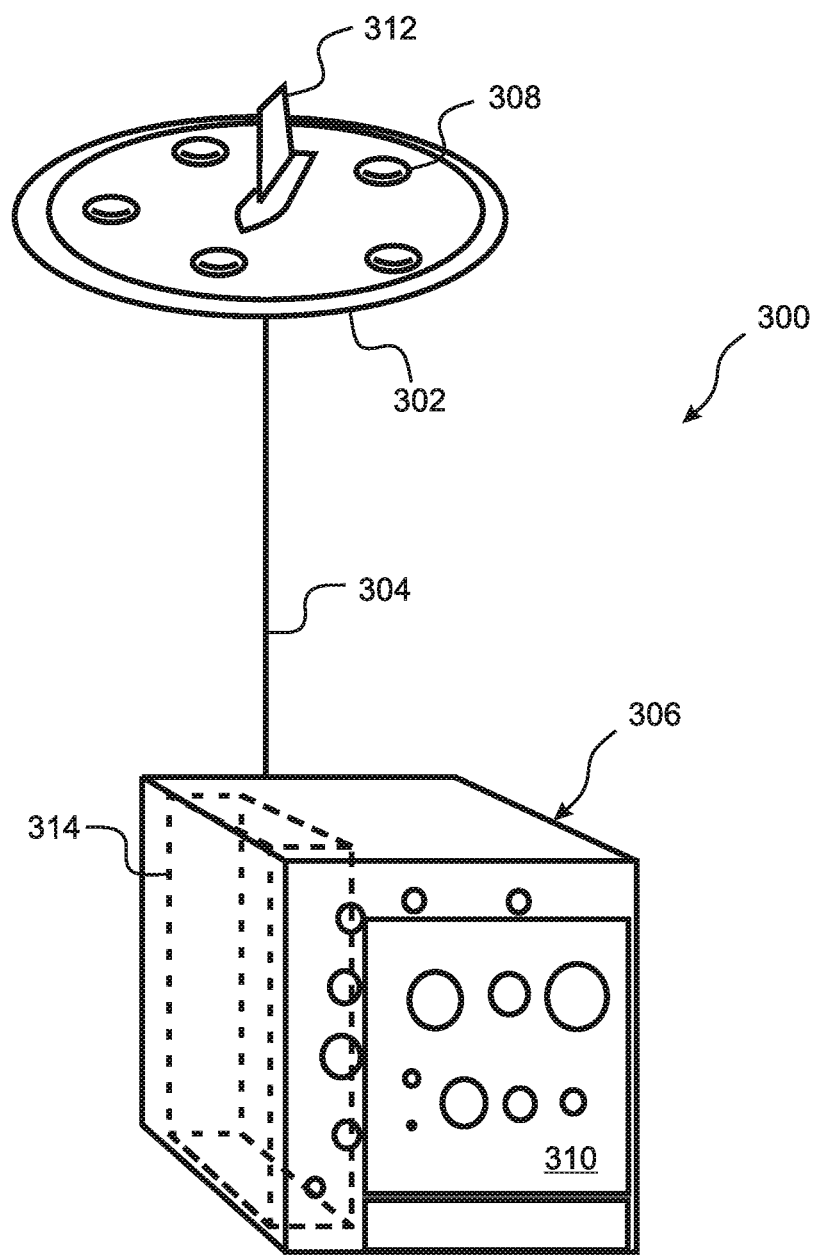
FIG. 3A is a simplified illustration of the physical architecture of an embodiment of the present disclosure.

With reference to FIG. 3A, the present disclosure is a Link 16 transceiver system 300 with integral signal nulling system 302, 304, 306 that is able to mitigating the effects of jamming while improving signal quality and minimizing the risk of inadvertently nulling friendly signals. The disclosed transceiver system 300 detects signals received within the Link 16 bandwidth using an antenna array 302. A "System on a Chip" ("SoC") is associated with each receive antenna element 308 in the array, and is used to digitize the received data, and then to transmit the digitized data to a to a TRANSEC-aware channelizer that channelizes the data and transfers the channelized data to a nulling system 314. The nulling system 314 applies signal nulling to the channelized data, in embodiments only to selected channels thereof, after which the nulled data is passed to a message controller 310 for further analysis and interpretation.

In the embodiment of FIG. 3A, each of the SoC's is TRANSEC-aware, and is able to channelize the data received by its associated antenna element 308, so that the SoC's in aggregate function as the channelizer. Accordingly, the channelized data is transferred directly from the SoC's to the nulling system 314, which in FIG. 3A is included with the message controller 310 in a Link 16 transceiver unit 306. Embodiments further include a blade transmitting antenna 312 in the antenna array 302.

In embodiments, the array antenna 302 with SoC's is conformal, and/or configured to be compatible as a direct replacement for an existing Link 16 blade antenna. In some embodiments, the Link 16 transceiver 306 is an otherwise conventional Link 16 transceiver, such as a CMN-4 transceiver that has been modified by replacing the digitizing and channelizing hardware with a nulling system 314 that is configured to apply a nulling algorithm to the received and channelized data. In some of these embodiments, the channelized data is transferred by the SoC's to the transceiver 306 over an existing serial data link 304 that is overclocked so as to accommodate the increased data load. Note that overclocking refers to operating the processor(s) of the serial data link at a higher speed than rated by increasing the clock speed. In one example the overclocking is done at 250% greater than the rated speed. In a further example the overclocking is between 200% to 300% greater than the clock speed.

Figure 3B:
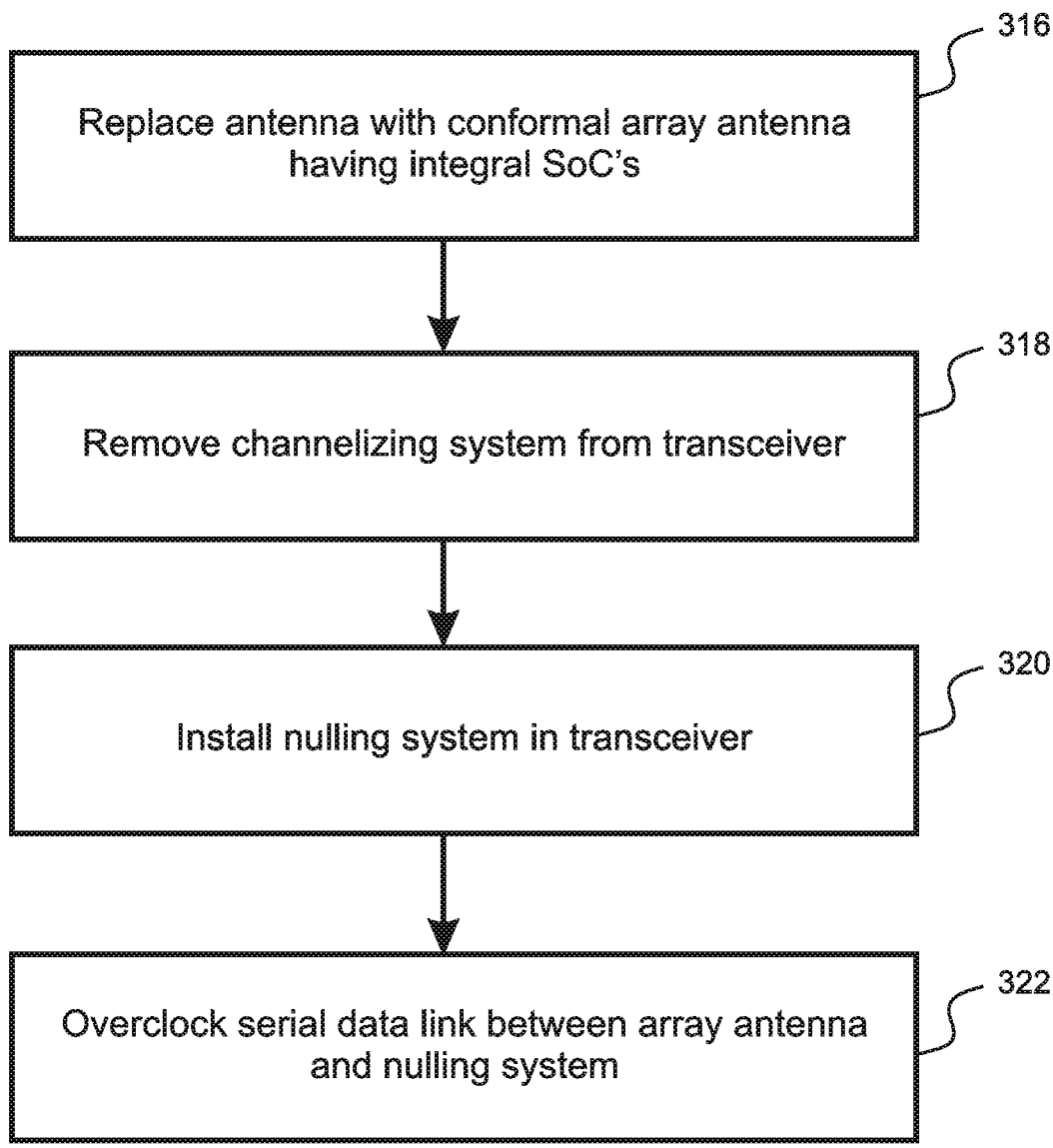
FIG. 3B is a flow diagram illustrating an embodiment of the method of upgrading an existing Link 16 transceiver system to include nulling capability according to an embodiment of the present disclosure.

Accordingly, with reference to FIG. 3B, in embodiments a conventional Link 16 transceiver system 306 can be configured for signal nulling simply by replacing 316 the blade antenna with the disclosed antenna array 302 with integral SoC's 308, removing 318 the channelizing hardware from the transceiver 306 and replacing it 320 with a nulling system 314, and overclocking 322 the serial data interface 304 that transfers the channelized data from the SoC's to the nulling system 314.

Unlike previous approaches to nulling Link 16 signals, the present nulling apparatus and method are TRANSEC-aware, and are thereby able to channelize the received data before nulling. Embodiments are further able to apply nulling algorithms selectively to only the energy received in the channels that are of interest, rather than nulling all of the energy received in entire Link 16 bandwidth. For example, a modified CMN-4 transceiver 306 may only be able to monitor four channels at any given time, so that it is only necessary to null the data received in those four channels.

Figure 4A:
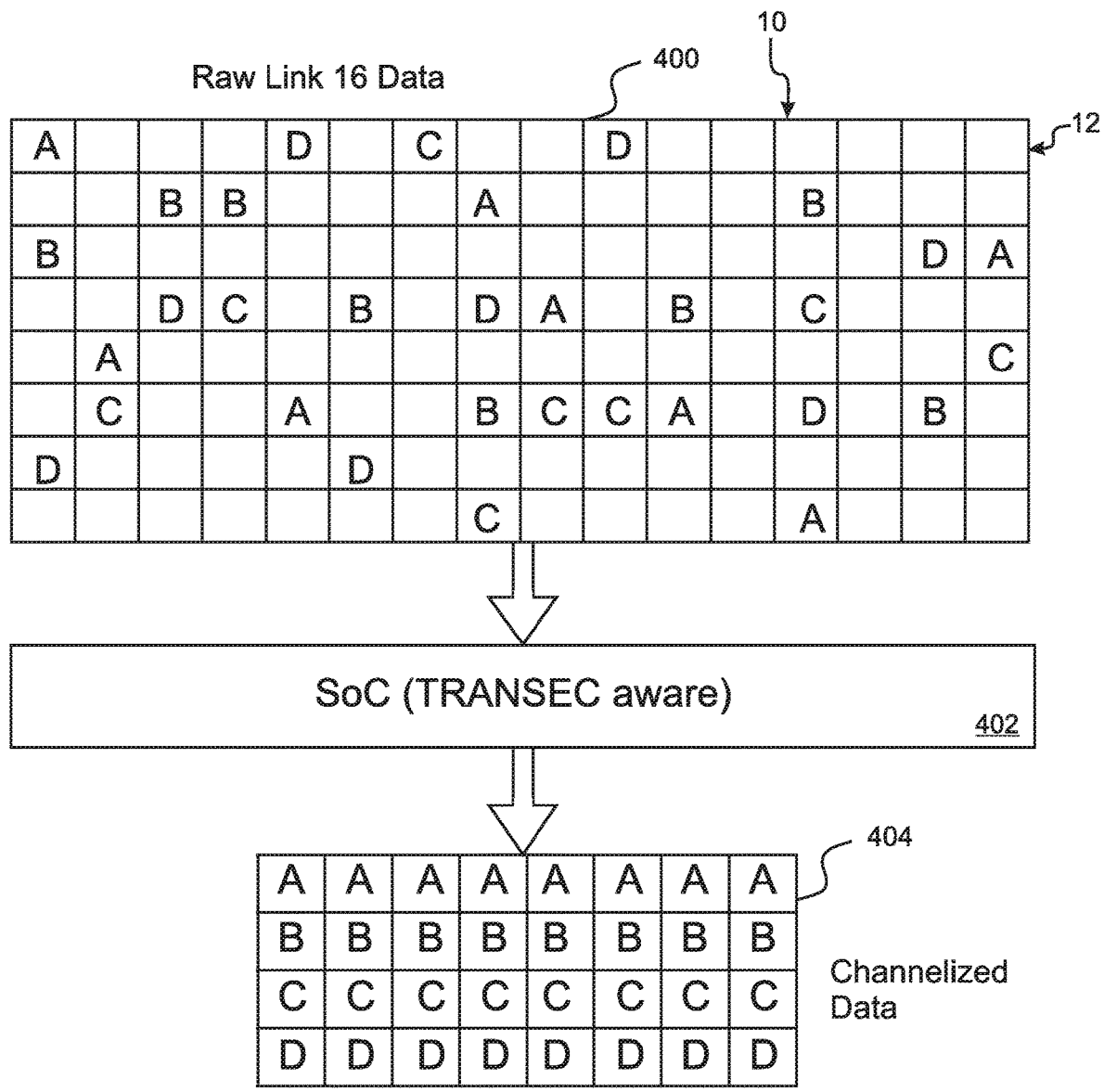
FIG. 4A is a simplified diagram illustrating channelizing of received Link 16 data by an SoC according to an embodiment of the present disclosure.

Accordingly, with reference to FIG. 4A, in embodiments the received data 400 may include four channels of interest, for example, which are indicated as A, B, C, and D in the figure. The data belonging to these four channels will be distributed among the 51 available frequencies 12 (only 8 are shown in the figure) and among the timeslots 10 of each epoch (only 16 timeslots are illustrated in the figure). The frequency hopping patterns and timeslot assignments are determined by pseudorandom algorithms that are controlled by one or more unique keys. However, because the SoC chips 402 are TRANSEC-aware, they are aware of the frequency hopping patterns and timeslot assignments that are in use, and are able to select the appropriate timeslots and frequencies and to assemble the received data into channelized data 404.

Figure 4B:
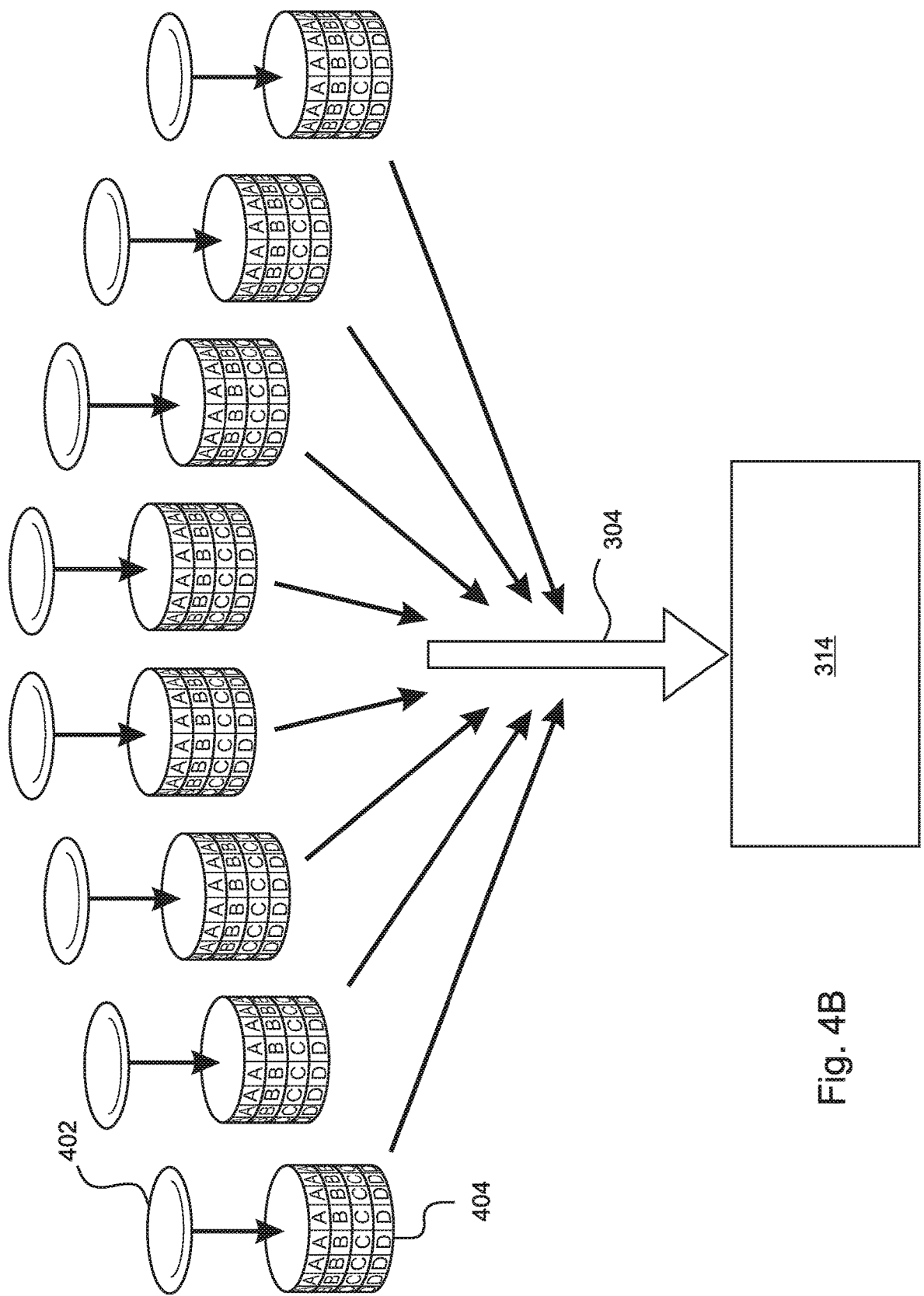
FIG. 4B illustrates channelizing of received data by a plurality of SoC's associated with corresponding receiving antenna elements in an antenna array, and transmission of the channelized data to a nulling apparatus in a Link 16 transceiver according to an embodiment of the present disclosure.

With reference to FIG. 4B, each of the SoC's 402 associated with the receive antennas 308 in the antenna array 302 receives and channelizes a full set of data, at least for the channels of interest, and then the channelized data from all of the SoC's 402 is transferred to the nulling system 314 for application of weighting factors according to the nulling algorithm. In embodiments, the channelized data is transmitted as multiplexed serial data over an existing data link 304, such as a conventional Link 16 RF coaxial cable. So as to accommodate all of the required data, in some of these embodiments the serial data link 304 is overclocked. In embodiments, the serial data link 304 is overclocked by a factor of between 200% and 300%.

As a result, with reference again to FIG. 3A, the nulling system 314 is able to apply nulling selectively to only the signal channels 404 that are being monitored by the message controller 310. This approach significantly reduces the constraints that are placed on the nulling algorithm, thereby focusing the nulling process onto only the channels of interest, simplifying the nulling solution, improving the nulling result, and reducing the occurrence of nulling "side lobes" and of unintended nulling of friendly signals.

Figure 5:
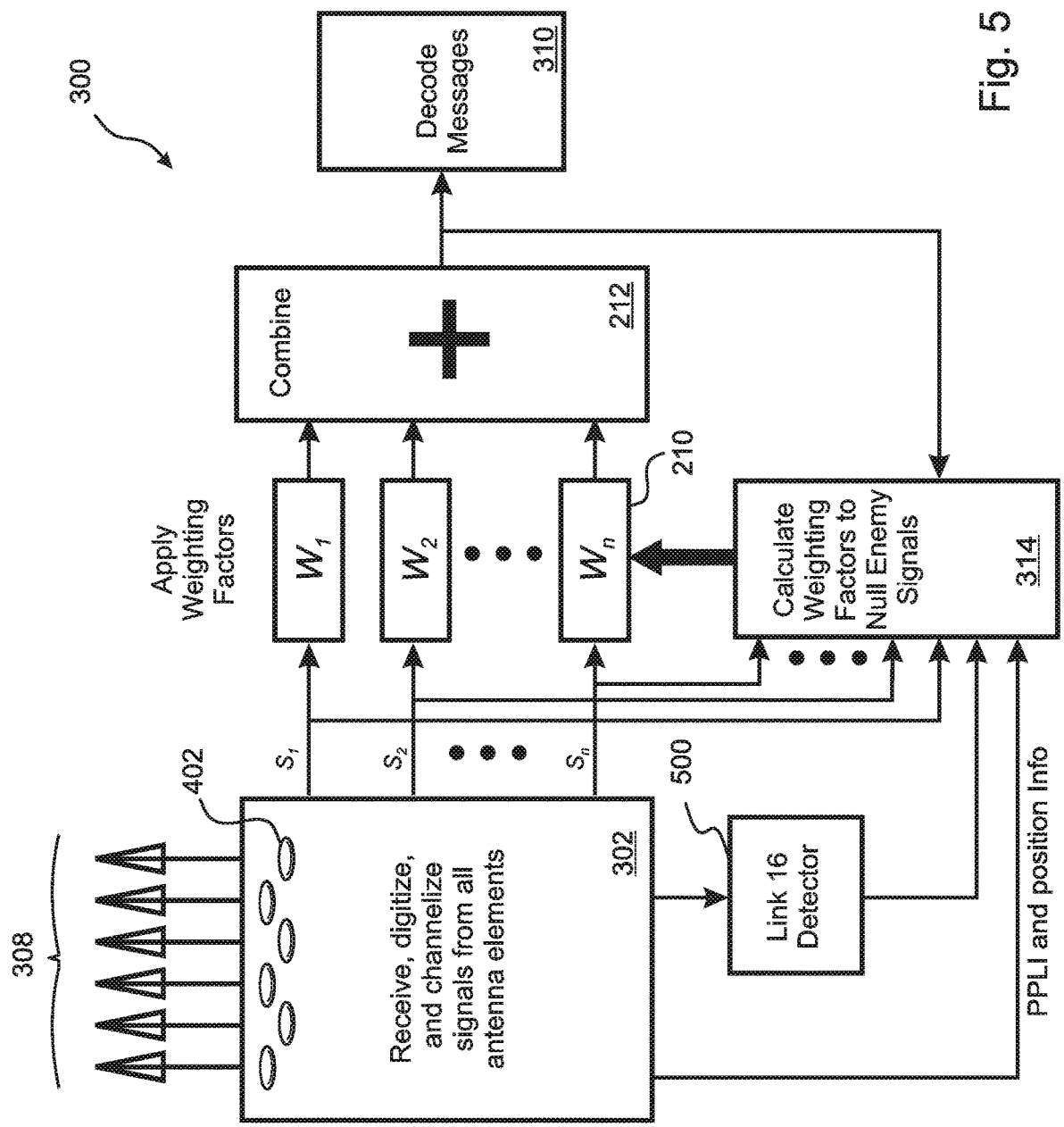
FIG. 5 is a detailed block diagram illustrating components of a nulling transceiver system according to an embodiment of the present disclosure.

Furthermore, with reference to FIG. 5, embodiments of the present disclosure are able to apply a Link-16 "detector" 500 to the received data, so as to distinguish desired signals from jamming and other undesirable signals based on signal characteristics, rather than signal amplitude. This approach allows the nulling system 314 in embodiments of the present disclosure to calculate weighting factors 210 that will null undesired signals and to retain desired signals, even in cases where the desired signals are stronger than the undesired signals. In various embodiments, the Link-16 detector 500 discriminates between desirable Link 16 and undesired, hostile signals such as jamming signals on the basis of signal features such as modulation type, pulse rise and/or fall times, pulse widths, and/or other characteristics of Link 16 signals that are very different from typical jamming signals.

Furthermore, embodiments use PPLI information received from Link 16 messages and/or other situational awareness information, in combination with instantaneous awareness of the location and orientation of the Link 16 antenna array 302, to determine geographical directions from which friendly signals can be expected and/or directions from which only enemy signals can be expected, and use this information as a basis from which to calculate initial weighting factors 210 for signal nulling.

And because the received data is channelized before the nulling is applied, there is no need to reconvert the nulled data back into analog format and then reconvert to digital format, as is the case with existing approaches to Link 16 signal nulling.

Figure 6:
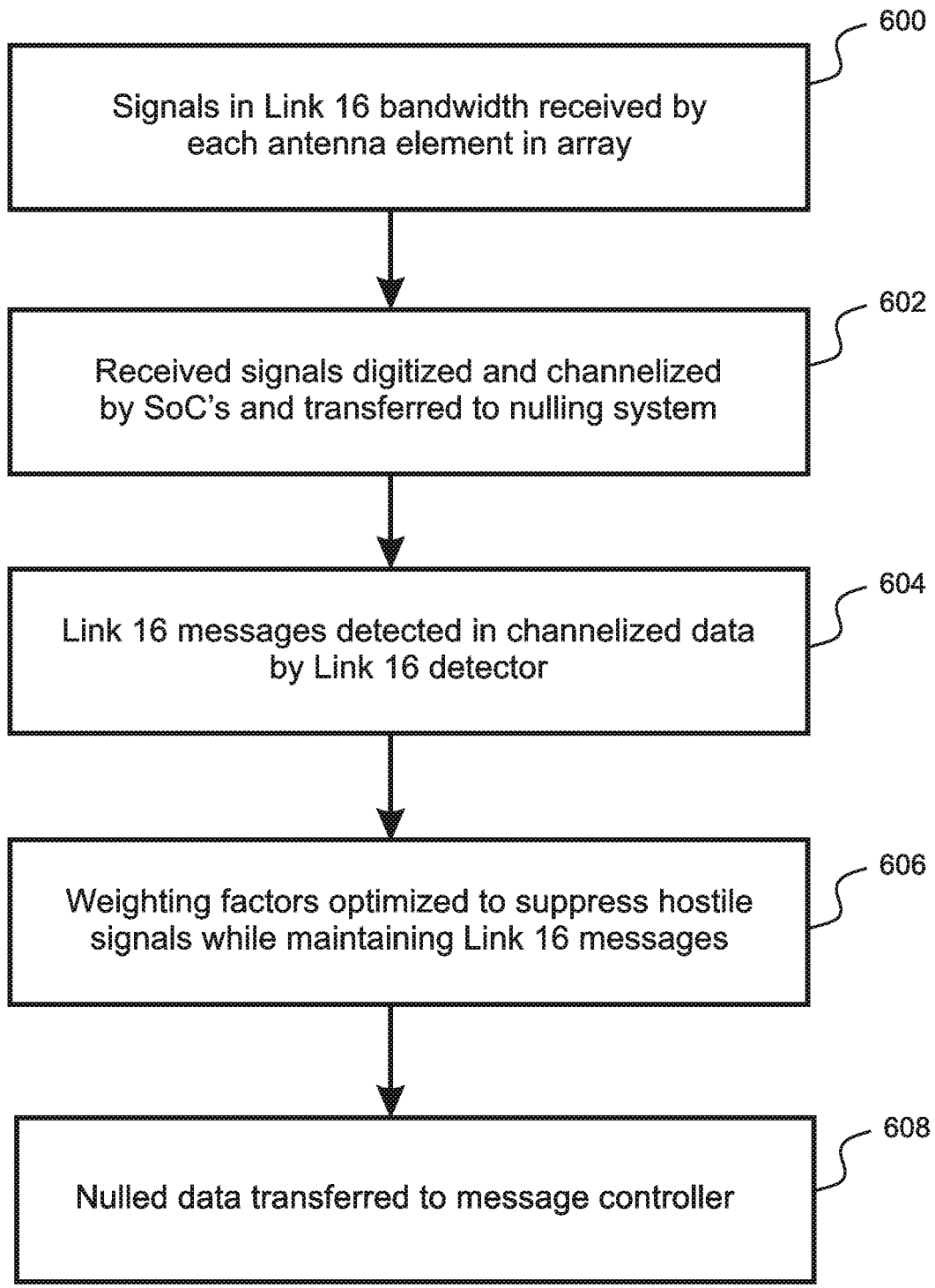
FIG. 6 is a flow diagram illustrating an embodiment of the method of the present disclosure.

With reference to FIG. 6, method embodiments of the present disclosure include receiving of wireless signal energy within a Link 16 bandwidth by a plurality of receiving antennae in an antenna array 600, channelizing of the received data, which in embodiments is by SoC's that are associated with the receiving antennae and integral to the antenna array 602, detecting of Link 16 messages within the channelized data, for example using a Link 16 detector 604, optimizing weighting factors and applying them to the channelized data so as to suppress hostile signals included in the channelized data, while maintaining the Link 16 messages included in the channelized data 606, and transferring the nulled data to an MSEC-aware message controller 608.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications without departing from the spirit thereof. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

What is claimed is:

1. A Link 16 transceiver with an integral signal nulling system, the transceiver comprising:
   an antenna array comprising a plurality of receiving antenna elements configured to receive wireless signals within a Link 16 bandwidth;
   for each of the receiving antenna elements, a system-on-a chip (SoC) associated with the receiving antenna element and configured to digitize the wireless signals received by the receiving antenna into digitized data;
   a TRANSEC-aware channelizer configured to channelize the digitized data;
   a nulling system in data communication with the channelizer, and configured to receive the channelized data and apply a set of weighting factors thereto according to a nulling algorithm so as to convert the channelized data into nulled data in which hostile signals included in the channelized data are suppressed while one or more Link 16 messages included in the channelized data are maintained; and
   an MSEC-aware Link 16 message controller in data communication with the nulling system, the message controller being configured to receive the nulled data and interpret the Link 16 messages included in the nulled data.

2. The transceiver of claim 1, wherein the TRANSEC-aware channelizer is included in the SoC's, in that each SoC is TRANSEC-aware, and each SoC converts the wireless signals received by its associated antenna element into the channelized data.

3. The transceiver of claim 2, wherein the SoC's are configured to channelize and transmit to the nulling system only energy received in the one or more Link 16 channels that are designated by the message controller to be channels of interest.

4. The transceiver of claim 2, further comprising a serial data link configured for transmission thereby of the channelized data from the SoC's to the nulling system.

5. The transceiver of claim 4, wherein the serial data link is configured for overclocked communication of the channelized data.

6. The transceiver of claim 5, wherein the serial data link is overclocked by a factor of between 200% and 300%.

7. The transceiver of claim 1, further comprising a Link 16 detector included in the nulling system and configured to discriminate between Link 16 signals included in the channelized data and hostile signals, the nulling system being configured to maintain the Link 16 messages and to suppress the hostile signals.

8. The transceiver of claim 7, wherein the Link 16 detector discriminates between Link 16 signals and the hostile signals that are not Link 16 signals on the basis of at least one of modulation type, pulse rise times, pulse fall times, and pulse widths.

9. The transceiver of claim 1, wherein the antenna array is a conformal antenna array.

10. The transceiver of claim 1, wherein the antenna array further comprises a transmission blade configured for transmitting the wireless signals within the Link 16 bandwidth.

11. The transceiver of claim 1, wherein the antenna array is compatible as a direct replacement for a non-arrayed Link 16 blade antenna.

12. The transceiver of claim 1, wherein the nulling system is able to use position and orientation information regarding the antenna array in combination with situational information that includes estimated locations of friendly transmitters to predict and optimize the set of weighting factors that are applied to the channelized data.

13. The transceiver of claim 1, wherein the nulling system applies a space time adaptive processing algorithm when calculating the set of weighting factors.

14. A method of suppressing hostile wireless signals while retaining Link 16 messages, the method comprising:
   receiving of wireless signals within a Link 16 bandwidth by a plurality of receiving antenna elements included in an antenna array;
   for each of the receiving antenna elements, converting of the received wireless signals into channelized data;
   transferring of the channelized data to a nulling system; and
   determining a set of weighting factors according to a nulling algorithm and applying the set of weighting factors to the channelized data, thereby converting the channelized data into nulled data in which hostile signals included in the channelized data are suppressed while the Link 16 messages included in the channelized data are maintained.

15. The method of claim 14, wherein for each of the receiving antenna elements, the wireless signals received by the receiving antenna element are converted into channelized data by a TRANSEC-aware SoC that is associated with the receiving antenna element.

16. The method of claim 14, further comprising interpreting by an MSEC-aware Link 16 message controller of the Link 16 messages included in the nulled data.

17. The method of claim 14, wherein only channelized data included in channels that are designated to be channels of interest are transferred by the SoC's to the nulling system.

18. The method of claim 14, wherein the channelized data is transferred to the nulling system via a serial data link.

19. The method of claim 18, wherein transferring the channelized data via the serial data link includes overclocking the serial data link.

20. The method of claim 19, wherein overclocking the serial data link includes overclocking the serial data link by a factor of between 200% and 300%.

21. The method of claim 14, wherein determining the set of weighting factors includes using a Link 16 detector to discriminate between Link 16 signals included in the channelized data and signals included in the channelized data that are not Link 16 signals.

22. The method of claim 21, wherein the Link 16 detector discriminates between Link 16 signals and data that are not Link 16 signals on the basis of at least one of modulation type, pulse rise times, pulse fall times, and pulse widths.

23. The method of claim 14, wherein determining the set of weighting factors according to the nulling algorithm includes applying a space time adaptive processing algorithm.

24. The method of claim 14, wherein determining the set of weighting factors includes using position and orientation information regarding the antenna array in combination with situational information that includes estimated locations of friendly transmitters to predict and optimize the set of weighting factors.

25. A method of adding signal nulling capability to a Link 16 transceiver, the method comprising:
   replacing an antenna of the Link 16 transceiver with an antenna array comprising a plurality of receiving antenna elements configured to receive wireless signals within a Link 16 bandwidth where, for each of the receiving antenna elements, a TRANSEC-aware system-on-a chip (SoC) is associated with the receiving antenna element and configured to convert the wireless signals received by the receiving antenna element into channelized data;
   removing from the Link 16 transceiver a subsystem configured for channelizing received data; and
   installing within the Link 16 transceiver a nulling system in data communication with the SoC's and configured to receive the channelized data therefrom and apply a set of weighting factors thereto according to a nulling algorithm so as to convert the channelized data into nulled data in which hostile signals included in the channelized data are suppressed while Link 16 messages included in the channelized data are maintained, the nulling system being further configured to transfer the nulled data to the Link 16 transceiver.

26. The method of claim 25, wherein the antenna array is a conformal antenna array.

27. The method of claim 25, further comprising reconfiguring a serial data link of the Link 16 transceiver so as to transfer the channelized data from the SoC's to the nulling system in an overclocked transfer mode.

28. The method of claim 27, wherein the overclocked transfer mode is overclocked by a factor of between 200% and 300%.

* * * * *